(12) United States Patent
Movsisyan et al.

(10) Patent No.: US 11,336,505 B2
(45) Date of Patent: May 17, 2022

(54) PERSISTENT ALERT NOTES

(71) Applicant: VMware, Inc., Palo Alto, CA (US)

(72) Inventors: Vardan Movsisyan, Yerevan (AM); Steven Flanders, Nashua, NH (US)

(73) Assignee: VMWARE, INC., Palo Alto, CA (US)

( * ) Notice: Subject to any disclaimer, the term of this patent is extended or adjusted under 35 U.S.C. 154(b) by 343 days.

(21) Appl. No.: 15/179,656

(22) Filed: Jun. 10, 2016

(65) Prior Publication Data

US 2017/0359215 A1 Dec. 14, 2017

(51) Int. Cl.
| | |
|---|---|
| *H04L 15/16* | (2006.01) |
| *H04L 29/08* | (2006.01) |
| *H04L 12/24* | (2006.01) |
| *G06F 15/16* | (2006.01) |
| *G06F 7/00* | (2006.01) |
| *H04L 12/26* | (2006.01) |
| *H04L 41/0631* | (2022.01) |
| *H04L 41/046* | (2022.01) |
| *H04L 41/0686* | (2022.01) |
| *H04L 41/069* | (2022.01) |
| *H04L 41/22* | (2022.01) |

(52) U.S. Cl.
CPC ........ *H04L 41/0631* (2013.01); *H04L 41/046* (2013.01); *H04L 41/069* (2013.01); *H04L 41/0686* (2013.01); *H04L 41/22* (2013.01)

(58) Field of Classification Search
CPC ... H04L 41/0631; H04L 41/22; H04L 41/069; H04L 41/046; H04L 41/0686
USPC ........................................................ 709/224
See application file for complete search history.

(56) References Cited

U.S. PATENT DOCUMENTS

| | | | | |
|---|---|---|---|---|
| 6,389,464 | B1 * | 5/2002 | Krishnamurthy ... | H04L 41/0213 709/220 |
| 6,618,780 | B1 * | 9/2003 | Popat ...................... | G06F 13/26 710/262 |
| 6,684,265 | B2 * | 1/2004 | Graf .................... | G06F 11/0715 700/291 |
| 7,191,244 | B2 * | 3/2007 | Jennings ................. | H04L 29/06 709/231 |
| 7,346,678 | B1 * | 3/2008 | Zhu ..................... | G06F 11/3495 709/204 |
| 7,392,484 | B1 * | 6/2008 | Garfinkel ................ | G06F 40/10 715/751 |
| 8,024,367 | B2 * | 9/2011 | Heinzel ................ | G06Q 10/107 707/802 |

(Continued)

FOREIGN PATENT DOCUMENTS

| | | | | |
|---|---|---|---|---|
| WO | WO-2007040858 A1 * | 4/2007 | ......... | H04L 41/0853 |
| WO | WO-2010123475 A1 * | 10/2010 | ............. | H04L 51/22 |

*Primary Examiner* — David R Lazaro
*Assistant Examiner* — Berhanu Shitayewoldetadik

(57) ABSTRACT

The present disclosure is related to devices, systems, and methods for persistent alert notes. An example method can include receiving an alert message via a log management server, wherein the alert message indicates a current alert instance particular to a class of alerts, retrieving, in response to receiving the alert message, a note stored in association with the class of alerts via the log management server, wherein the note includes resolution information corresponding to a previous alert instance particular to the class of alerts, and providing the retrieved note via a user interface of the log management server.

15 Claims, 4 Drawing Sheets

(56) References Cited

U.S. PATENT DOCUMENTS

| | | | | |
|---|---|---|---|---|
| 8,026,814 | B1* | 9/2011 | Heinze | G08B 13/1427 340/572.1 |
| 8,069,370 | B1* | 11/2011 | Li | H04L 41/064 714/26 |
| 8,291,268 | B2* | 10/2012 | Acuna | G06F 11/0766 714/48 |
| 9,160,539 | B1* | 10/2015 | Juels | G06F 21/554 |
| 9,424,742 | B1* | 8/2016 | Solomon | G08C 19/16 |
| 2002/0087649 | A1* | 7/2002 | Horvitz | G06Q 10/107 709/207 |
| 2002/0099842 | A1* | 7/2002 | Jennings | H04L 47/2416 709/231 |
| 2002/0178074 | A1* | 11/2002 | Bloom | G06Q 10/08 705/26.81 |
| 2003/0023721 | A1* | 1/2003 | Vinberg | G06F 3/0481 709/224 |
| 2003/0088534 | A1* | 5/2003 | Kalantar | G06Q 10/06311 706/50 |
| 2003/0115122 | A1* | 6/2003 | Slater | G06Q 10/10 705/35 |
| 2003/0145080 | A1* | 7/2003 | Breese | H04L 43/16 709/224 |
| 2003/0200486 | A1* | 10/2003 | Marwaha | H04L 41/0686 714/39 |
| 2003/0236752 | A1* | 12/2003 | Dawson | G06Q 30/06 705/54 |
| 2004/0088314 | A1* | 5/2004 | Simes | G06F 11/3409 |
| 2004/0128353 | A1* | 7/2004 | Goodman | H04L 51/04 709/204 |
| 2005/0071643 | A1* | 3/2005 | Moghe | G06F 21/552 713/182 |
| 2005/0138111 | A1* | 6/2005 | Aton | G06F 11/3476 709/201 |
| 2005/0144151 | A1* | 6/2005 | Fischman | G06N 5/045 706/45 |
| 2005/0219044 | A1* | 10/2005 | Douglass | G08B 25/00 340/506 |
| 2006/0031473 | A1* | 2/2006 | Wood | H04L 41/0631 709/224 |
| 2006/0109113 | A1* | 5/2006 | Reyes | G08B 25/085 340/541 |
| 2006/0117091 | A1* | 6/2006 | Justin | G06F 11/3476 709/217 |
| 2006/0143034 | A1* | 6/2006 | Rothermel | G06Q 10/10 705/301 |
| 2006/0277087 | A1* | 12/2006 | Error | G06Q 10/10 705/7.18 |
| 2007/0121529 | A1* | 5/2007 | Meier | H04L 45/04 370/256 |
| 2007/0165622 | A1* | 7/2007 | O'Rourke | H04L 67/1002 370/389 |
| 2007/0169149 | A1* | 7/2007 | Jennings | H04N 21/458 725/58 |
| 2007/0196074 | A1* | 8/2007 | Jennings | H04N 21/812 386/234 |
| 2008/0005319 | A1* | 1/2008 | Anderholm | H04L 41/0866 709/224 |
| 2008/0215726 | A1* | 9/2008 | Sullivan | H04L 41/5012 709/224 |
| 2008/0316931 | A1* | 12/2008 | Qiu | H04L 41/5009 370/245 |
| 2009/0327429 | A1* | 12/2009 | Hughes | G06Q 10/107 709/206 |
| 2010/0199188 | A1* | 8/2010 | Abu-Hakima | H04L 67/26 715/733 |
| 2010/0229096 | A1* | 9/2010 | Maiocco | H04L 41/064 715/734 |
| 2010/0275219 | A1* | 10/2010 | Carlson | G06F 3/0605 719/326 |
| 2011/0041081 | A1* | 2/2011 | Muller | G06F 9/451 715/751 |
| 2011/0145383 | A1* | 6/2011 | Bishop | H04L 41/069 709/223 |
| 2011/0153744 | A1* | 6/2011 | Brown | G06F 40/169 709/204 |
| 2012/0197833 | A1* | 8/2012 | Lorge | G06N 5/02 706/47 |
| 2012/0259962 | A1* | 10/2012 | Bose | H04L 41/50 709/223 |
| 2013/0042011 | A1* | 2/2013 | Sugizaki | H04Q 3/0045 709/227 |
| 2013/0275579 | A1* | 10/2013 | Hernandez | H04L 67/22 709/224 |
| 2014/0046728 | A1* | 2/2014 | Tryfon | G06Q 10/107 705/7.32 |
| 2014/0068629 | A1* | 3/2014 | Boller | G06F 11/0709 719/313 |
| 2014/0143831 | A1* | 5/2014 | Fieweger | G06F 21/64 726/3 |
| 2014/0236844 | A1* | 8/2014 | Shaw | G06Q 30/012 705/303 |
| 2015/0082281 | A1* | 3/2015 | Koenig | G06F 11/008 717/124 |
| 2015/0156077 | A1* | 6/2015 | Gao | H04L 41/0686 709/223 |
| 2015/0310457 | A1* | 10/2015 | Smith | G06Q 30/0201 705/7.29 |
| 2016/0012196 | A1* | 1/2016 | Mark | G06Q 10/00 705/2 |
| 2016/0034445 | A1* | 2/2016 | Setayesh | H04L 51/046 704/9 |
| 2016/0196735 | A1* | 7/2016 | Clayman | G08B 25/016 340/573.1 |
| 2016/0269908 | A1* | 9/2016 | Richards | H04L 63/083 |
| 2019/0163550 | A1* | 5/2019 | Harutyunyan | G06F 11/079 |

* cited by examiner

PERSISTENT ALERT NOTES

BACKGROUND

Alerts can communicate events that may call for human involvement. In some cases, an alert instance can include a description of an event and/or a timestamp associated with the event. In resolving an alert instance, a user may generate one or more notes containing information pertinent to resolving the alert instance.

DETAILED DESCRIPTION

Figure 1:
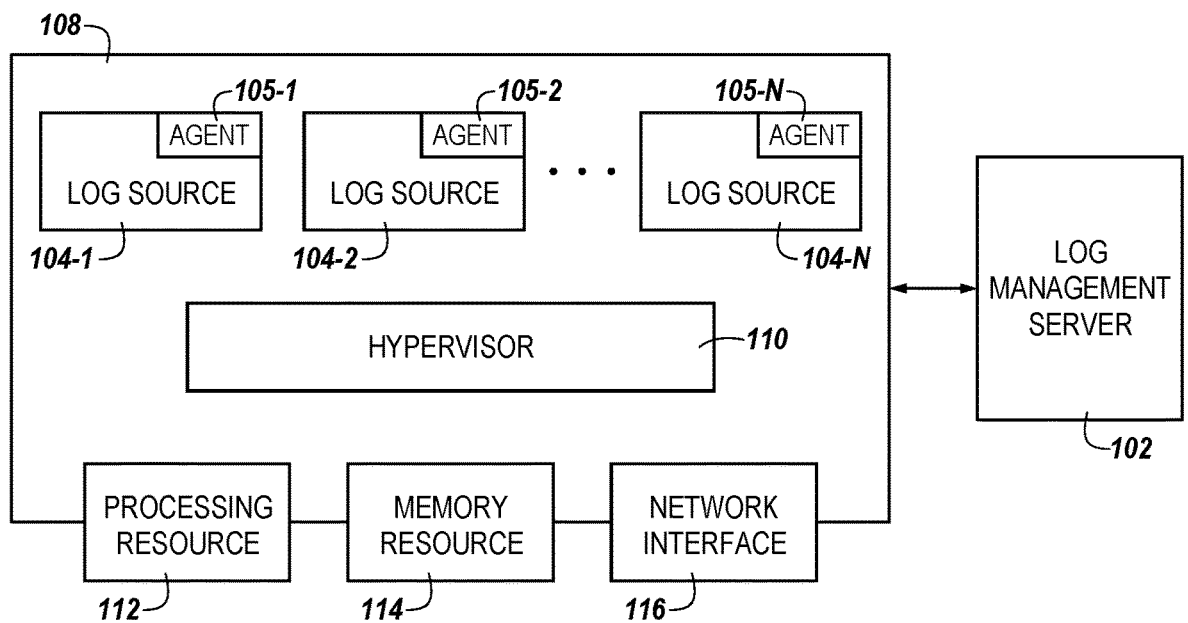
FIG. 1 is a diagram of an example of an infrastructure for persistent alert notes according to the present disclosure.

A log source, as used herein, refers to a source of one or more system logs (e.g., event and/or status logs). In general, a log source can refer to any entity capable of generating logs. For instance, a log source can be a server (e.g., a physical server), a virtual computing instance, an application, a host, a network device, a desktop computing device, an event channel, a log aggregator, a log file, etc. A log management server can monitor logs of, and/or configure, one or more log sources. Alerts can be generated for one or more log sources. The log management server can receive, retrieve, store, and/or display alerts. In some embodiments, the log management server can outsource one or more aspects of receiving, retrieving, storing, and/or displaying alerts to other entities.

As discussed further below, a single instance of an alert is herein referred to as an "alert instance." An alert instance can be particular to a class of alerts. In some embodiments, each alert instance can belong to a particular class. As used herein, "class" refers to a type of one or more alert instances. Stated in other terms, an alert definition may be referred to as a class of alerts, while each triggered specific alert may be referred to as an "alert instance." In an example, a class of alerts can be defined as alerts triggered if during the last five minutes more than ten messages from an httpd application contain the keyword "error." An alert instance of that example class of alerts can be an alert triggered on 2045-12-31 12:34:56 for log source 1.2.3.4.

When a user, such as a system administrator, is provided with an alert instance, he or she may attempt to resolve the alert instance (e.g., resolve the problem indicated by the alert instance). In doing so, the user may generate one or more alert notes (herein referred to as "notes"). The notes may be textual notes including information defined by alphanumeric characters. The notes may include information relevant to the resolution of the alert instance (herein referred to as "resolution information"). In some embodiments, resolution information can include a list of prescribed steps used to resolve the alert instance (sometimes referred to herein as a "solution" to the alert instance). In some embodiments, resolution information may not include a solution, but may include information relating to a resolution of an alert instance. For example, resolution information can include insights, contextual information, questions, announcements, tips, hints, observations, questions, and others.

In previous approaches, a note (along with its resolution information) may be associated with (e.g., attached to or "pinned" to) the specific alert instance a user was attempting to resolve when the note was generated. If a similar alert instance were to occur subsequently, the note(s) generated for the first alert instance would likely be useful to the user in resolving the subsequent alert instance. However, because previous approaches do not provide these notes for subsequent alert instances, the user may need to determine a resolution to the subsequent alert instance from scratch. By not leveraging the prior efforts of users in resolving alert instances, unnecessary expenses in time and/or resources may be incurred. Users may be left trying to find specific alert instances in a separate database in order to determine whether any helpful notes can be recovered. In some cases, users may consult operations guides and/or manuals which may be out-of-context or obsolete.

Embodiments of the present disclosure can store such notes in association with classes of alerts, rather than just in association with specific alert instances. Accordingly, when notes are generated in connection with the resolution of a first alert instance particular to a class of alerts, any subsequent occurrences of alert instances belonging to that class can be accompanied by helpful, context-appropriate, resolution information. Users can automatically (e.g., without input) be provided with information that allows them to resolve an alert instance without having to seek it out each time.

In some embodiments, a functionality (e.g., an icon) can be provided to pin a note to a class of alerts to which an alert instance belongs. For example, a selectable display item (e.g., reading "Pin Note," "Pin to Class," etc.) can be provided. The selection of the item can cause the note to be stored in association with the class. Later, when a subsequent alert instance of that class of alerts is received or retrieved, the note that was previously pinned to the class of alerts can be displayed. The note can contain resolution information. As discussed further below, resolution information can include prescribed steps for resolving an alert instance of the class of alerts in some embodiments. Resolution information can include information other than steps, such as contextual information, tips, hints, observations, questions, and others.

More than one note can be provided responsive to an alert message indicating an alert instance. Embodiments of the present disclosure can include sorting multiple notes according to their utility. For example, users may be provided with the ability to "upvote" notes or otherwise indicate that a note is of use with respect to resolving an alert instance. Notes receiving more votes may be displayed with a higher priority than those receiving fewer. Notes including resolution steps may receive a designation of "always on top" as they may offer the quickest path to resolution. Other manners of sorting and/or prioritizing notes are in accordance with embodiments herein. As discussed further below, notes with the most views may be displayed on top; notes that were the final notes of a previous alert instance of the class (e.g., note(s) that occurred immediately preceding the resolution of a previous alert instance of the class) may be displayed on top. As a result, even users with little training and/or experience can readily obtain valuable information they can use to resolve alert instances.

As referred to herein, the term "log source" can refer to a virtual computing instance (VCI), which covers a range of computing functionality. VCIs may include non-virtualized physical hosts, virtual machines (VMs), and/or containers. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in a software defined data center. In such a system, information can be propagated from an end user to at least one of the VCIs in the system, between VCIs in the system, and/or between at least one of the VCIs in the system and a management server. In some embodiments, the log management server can be provided as a VCI. Software defined data centers are dynamic in nature. For example, VCIs and/or various application services, may be created, used, moved, or destroyed within the software defined data center. When VCIs are created, various processes and/or services start running and consuming resources. As used herein, "resources" are physical or virtual components that have a finite availability within a computer or software defined data center. For example, resources include processing resources, memory resources, electrical power, and/or input/output resources.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. A group or plurality of similar elements or components may generally be referred to herein with a single element number. For example a plurality of reference elements 104-1, 104-2, . . . , 104-N may be referred to generally as 104. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure, and should not be taken in a limiting sense.

FIG. 1 is a diagram of an example of an infrastructure for persistent alert notes according to the present disclosure. For example, FIG. 1 can be a diagram of a host 108 for persistent alert notes according to the present disclosure. The host 108 can include processing resources 112 (e.g., a number of processors), memory resources 114, and/or a network interface 116. Memory resources 114 can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. For example, the memory resources 114 may comprise primary and/or secondary storage.

The host 108 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 108 can incorporate a hypervisor 110 that can execute a number of VCIs 104-1, 104-2, . . . , 104-N that can each provide the functionality of a log source. As such, the VCIs may be referred to herein as "log sources." The log sources 104-1, 104-2, . . . , 104-N are referred to generally herein as "log sources 104." The log sources 104 can be provisioned with processing resources 112 and/or memory resources 114 and can communicate via the network interface 116. The processing resources 112 and the memory resources 114 provisioned to the servers 104 can be local and/or remote to the host 108. For example, in a software defined data center, the log sources 104 can be provisioned with resources that are generally available to the software defined data center and are not tied to any particular hardware device. By way of example, the memory resources 114 can include volatile and/or non-volatile memory available to the log sources 104. The log sources 104 can be moved to different hosts (not specifically illustrated), such that different hypervisors manage the log sources 104. In some embodiments, a log source among the number of log sources can be a master log source. For example, log sources 104-1 can be a master log sources, and log sources 104-2, . . . , 104-N can be slave log sources. In some embodiments, each log sources 104 can include a respective logging agent 105-1, 105-2, . . . , 105-N (referred to generally herein as logging agents 105) deployed thereon.

In some embodiments, each the log sources 104 can provide a same functionality. In some embodiments, one or more of the log sources 104 can provide a different functionality than another of the one or more log sources 104. For example, one or more of the log sources 104 can provide email functionality. In some embodiments, one or more of the log sources 104 are configured to selectively permit client login. In some embodiments, one or more of the log sources 104 are email log sources. In some embodiments, one or more of the log sources 104 are application log sources. In a number of embodiments, one or more of the log sources 104 can be servers, such as files servers, print servers, communication servers (such as email, remote access, firewall, etc.), application servers, database servers, web servers, and others. Embodiments herein are not intended to limit the log sources 104 to a particular type and/or functionality.

The log sources 104 can each record and/or maintain a respective event log (herein referred to as a "log") which tracks events (e.g., actions, and/or activities) taking place on the respective log source. The logs can be recorded in real time, for instance. In some embodiments, the logs can track aspects of a number of applications and/or programs. In some embodiments, the logs can track physical and/or virtual hardware usage.

Events in the logs can be accompanied by event information. Event information included in each of the logs can include, for instance, a timestamp of an event, a source of the event (e.g., a particular UI), text associated with the event, and/or a name-value pair extracted from the event. Particular events can cause the triggering of alerts which can be communicated as "alert messages." In some embodiments, alert messages can be displayed by a user interface associated with the log management server 102. In some embodiments, a client device (e.g., a computing device) can pull alert messages from the log management server 102. In some embodiments, the log management server 102 can push alert messages to a client device. Thus, alert messages can be received and/or retrieved. An alert message can indicate an alert instance. An alert message can indicate a plurality of alert instances. As previously discussed, an alert instance is a single instance of an alert. An alert instance can be an event that calls for human involvement. An alert message indicating an alert instance can include a timestamp of the instance, a source of the instance, text associated with the alert instance, and/or a name-value pair.

Alert instances can be defined in part by a class to which they belong. For instance, a first class of alerts can include one or more alert instances of a first type. A second class of alerts can include one or more alert instances of a second type.

When an alert instance is resolved, a note containing resolution information can be associated with (e.g., pinned to) a class of alerts to which the alert instance belongs. It is noted that embodiments herein are not limited to associating notes with classes of alerts contemporaneously upon resolution of alert instances. For instance, notes can be associated with classes at any time subsequent to the resolution of an alert instance. In some embodiments, the association can be made without user input (e.g., automatically). In some embodiments, the association can be made responsive to an input (e.g., the selection of a selectable display element). The resolution information can be stored in association with the class of alerts via the log management server 102.

Resolution information includes information relevant to the resolution of a resolved alert instance. In some embodiments, resolution information can include steps for resolving the alert instance (e.g., steps followed to resolve a past alert instance). In some embodiments, resolution information includes insights, contextual information, questions, announcements, tips, hints, observations, questions, and/or others.

After the association of the note (e.g., the resolution information of the note) with the class of alerts, any subsequent alert message indicating an alert instance of that class can cause the note to be retrieved from storage. The storage can be provided by a storage functionality in communication with the log management server 102. In some embodiments, the storage functionality can be provided by the memory resources 114 (e.g., if the log management server 102 is on a same virtualization host 110 as the log sources 104). The retrieved note can be provided by a user interface (e.g., a display) of the log management server 102. The log management server 102 can store and/or organize a plurality of notes, each of which can be associated with (e.g., pinned to) a respective class of alerts. Based on the class of alerts to which a current alert instance belongs, different notes can be retrieved.

More than one note can be retrieved and/or provided. In some embodiments, more than one note can be associated with a particular class of alerts. A single user can associate more than one note with the class of alerts. Multiple users can each associate one or more notes with the class of alerts.

In some embodiments, notes can be provided that were not associated with a class of alerts responsive to user input. The log management server 102 can access notes generated in association with past alert instances particular to a class of alerts. Even if such notes were not actively associated with the class of alerts by a user, embodiments of the present disclosure can determine that they may be useful to a user confronted with a subsequent alert instance of the same class of alerts. Such an "unassociated" note may be determined to be of particular use if it was the last note that occurred before the previous alert instance of the class was resolved. Thus, it may contain information that led to the resolution. For instance, because a previous alert instance was resolved following that last note, embodiments herein can provide the note based on a determination that it includes relevant resolution information even if it was not stored in association with the class of alerts.

When a plurality of notes are associated with the class of alerts, embodiments herein can retrieve and provide them according to priority level. The plurality of notes can be provided in a list, for instance. In some embodiments, the list can be sorted by a respective quantity of views of each of the notes. In some embodiments, an evaluation of a note and/or the resolution information contained therein can be received. The evaluation can be an indication of a utility of the resolution information, for instance. In some embodiments, notes can be displayed in a particular manner based on evaluations of the notes (or the resolution information of the note). For instance, a list of notes can be sorted according to an indicated user evaluation of at least one of the notes; a note with a higher number of votes than another note may be displayed higher in the list. As previously discussed, an evaluation of the note (and/or the resolution information therein) may be an indication of a utility or a degree of usefulness of the note's resolution information. Such an indication may be made by "upvoting" a note, for instance.

According to embodiments herein, priority levels for displaying retrieved notes can be determined based on a content of the resolution information contained therein. In some embodiments, if the resolution information of a first note includes prescribed steps for resolving an unresolved alert instance of a given class of alerts (i.e., a solution), the first note may be given priority over a second note that merely includes information relating to a resolution of a prior alert instance (e.g., resolution information that does not contain prescribed solution steps). Such priority may persist even if the second note is viewed more and/or rated higher, in some embodiments. A distinction between prescribed steps for resolving an unresolved alert instance of a given class of alerts (i.e., a solution) and resolution information that does not contain prescribed solution steps can be made. In some embodiments, a note can be indicated as being or containing a solution by a user input. In some embodiments, whether resolution information of a note is or contains a solution can be deduced and/or determined (e.g., automatically determined) using machine learning, for instance, based on a text content of a note and/or other indicators.

When provided with the note(s) upon the occurrence of a current alert instance, a user can view the resolution information contained therein and use it to resolve the current alert instance. The user can generate additional notes and/or resolution information which can similarly be associated with the class of alerts. Accordingly, knowledge and experience can be compounded and persisted over a period of time and across a number of users. Embodiments herein can allow the leveraging of past successes and/or failures to reduce the time previously involved in resolving each new alert instance de novo.

Figure 2:
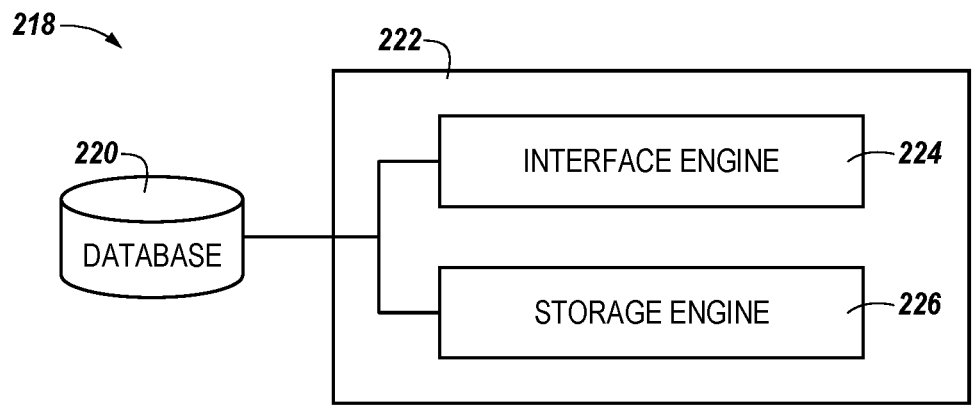
FIG. 2 is a diagram of a general logical system structure implementing persistent alert notes according to the present disclosure.

FIG. 2 is a diagram of a general logical system structure implementing persistent alert notes according to the present disclosure. For example, FIG. 2 can be a diagram of a system for persistent alert notes according to the present disclosure. The system shown in FIG. 2 can be implemented in a log management server, for instance, such as the log management server 102, previously discussed.

The system 218 can include a database 220, a subsystem 222, and/or a number of engines, for example an interface engine 224, and/or a storage engine 226, and can be in communication with the database 220 via a communication link. The system 218 can include additional or fewer engines than illustrated to perform the various functions described herein. The system 218 can represent program instructions and/or hardware of a machine (e.g., machine 330 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines (e.g., 224, 226) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the interface engine 224 can include a combination of hardware and program instructions that can be configured to receive resolution information corresponding to a resolved alert instance, wherein the resolved alert instance is particular to a class of alerts from a log management server. The interface engine 224 can include a combination of hardware and program instructions that can be configured to receive an input causing the resolution information to be associated with the class. As previously discussed, the input can be the selection of a selectable display element in some embodiments. The interface engine 224 can include a combination of hardware and program instructions that can be configured to display the resolution information responsive to an occurrence of a subsequent alert instance particular to the class of alerts. The interface engine 224 can include a combination of hardware and program instructions that can be configured to receive an evaluation of the resolution information. The evaluation can be an indication of a utility of the resolution information, for instance.

The storage engine 226 can be configured to cause the resolution information to be stored in association with the class of alerts. The storage engine 226 can be configured to cause the evaluation to be stored in association with the resolution information.

Figure 3:
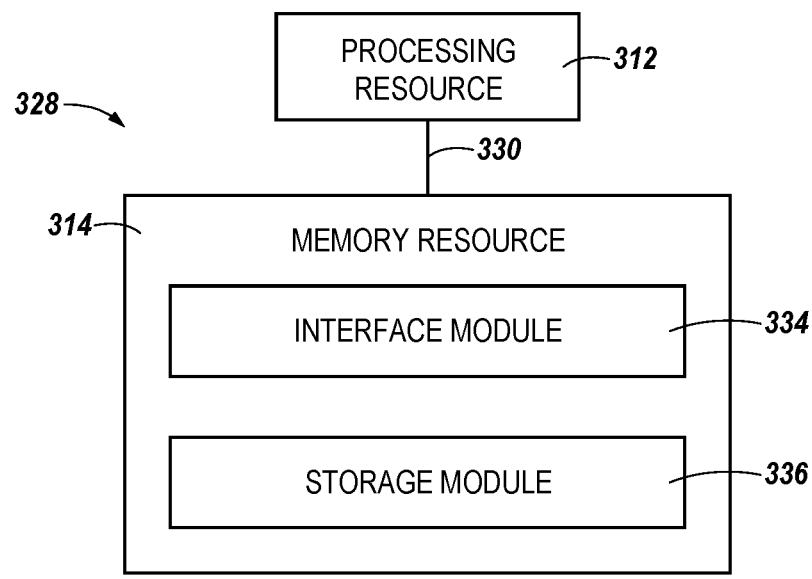
FIG. 3 is a diagram of an example system structure implementing persistent alert notes according to the present disclosure.

FIG. 3 is a diagram of an example system structure implementing persistent alert notes according to the present disclosure. For example, FIG. 3 can be a diagram of a machine for persistent alert notes according to the present disclosure. The machine 328 can utilize software, hardware, firmware, and/or logic to perform a number of functions. The machine 328 can be a combination of hardware and program instructions configured to perform a number of functions (e.g., actions). The hardware, for example, can include a number of processing resources 312 and a number of memory resources 314, such as a machine-readable medium (MRM) or other memory resources 314. The memory resources 314 can be internal and/or external to the machine 328 (e.g., the machine 328 can include internal memory resources and have access to external memory resources). The program instructions (e.g., machine-readable instructions (MRI)) can include instructions stored on the MRM to implement a particular function (e.g., an action such as storing resolution information in association with a class of alerts). The set of MRI can be executable by one or more of the processing resources 312. The memory resources 314 can be coupled to the machine 328 in a wired and/or wireless manner. For example, the memory resources 314 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

The memory resources 314 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 312 can be coupled to the memory resources 314 via a communication path 330. The communication path 330 can be local or remote to the machine 328. Examples of a local communication path 330 can include an electronic bus internal to a machine, where the memory resources 314 are in communication with the processing resources 312 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 330 can be such that the memory resources 314 are remote from the processing resources 312, such as in a network connection between the memory resources 314 and the processing resources 312. That is, the communication path 330 can be a network connection. Examples of such a network connection can include a local area network (LAN), wide area network (WAN), personal area network (PAN), and the Internet, among others.

As shown in FIG. 3, the MRI stored in the memory resources 314 can be segmented into a number of modules 334, 336 that when executed by the processing resources 312 can perform a number of functions. As used herein a module includes a set of instructions included to perform a particular task or action. The number of modules 334, 336 can be sub-modules of other modules. For example, the storage module 436 can be a sub-module of the interface module 334 and/or can be contained within a single module. Furthermore, the number of modules 334, 336 can comprise individual modules separate and distinct from one another. Examples are not limited to the specific modules 334, 336 illustrated in FIG. 3.

Each of the number of modules 334, 336 can include program instructions and/or a combination of hardware and program instructions that, when executed by a processing resource 312, can function as a corresponding engine as described with respect to FIG. 2. For example, the interface module 334 can include program instructions and/or a combination of hardware and program instructions that, when executed by a processing resource 312, can function as the interface engine 224, and/or the storage module 336 can include program instructions and/or a combination of hardware and program instructions that, when executed by a processing resource 312, can function as the storage engine 226.

Figure 4:
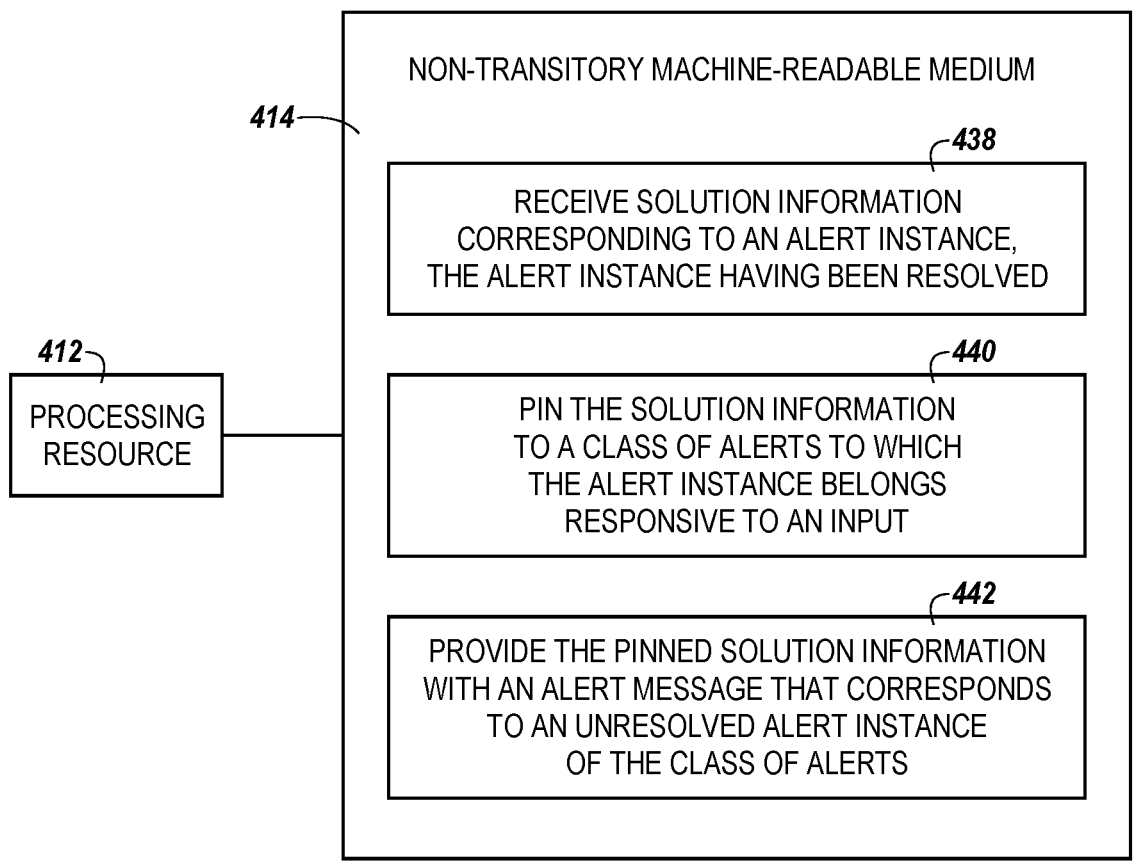
FIG. 4 illustrates a diagram of a non-transitory machine-readable medium for implementing persistent alert notes in accordance with one or more embodiments of the present disclosure.

FIG. 4 illustrates a diagram of a non-transitory machine-readable medium for persistent alert notes in accordance with one or more embodiments of the present disclosure. The medium 414 can be part of a machine that includes a processing resource 412. The processing resource 412 can be configured to execute instructions stored on the non-transitory machine readable medium 414. For example, the non-transitory machine readable medium 414 can be any type of volatile or non-volatile memory or storage, such as random access memory (RAM), flash memory, read-only memory (ROM), storage volumes, a hard disk, or a combination thereof. When executed, the instructions can cause the processing resource 412 to provide persistent alert notes.

The medium 414 can store instructions 438 executable by the processing resource 412 to receive resolution information corresponding to an alert instance, the alert instance having been resolved. In some embodiments, resolution information can be received in association with other current alert instances of the class. For instance, the resolution information can be received in connection with other current alert instances even if those alert instances have not yet been resolved. The medium 414 can store instructions 440 executable by the processing resource 412 to pin the resolution information to a class of alerts to which the resolved alert instance belongs responsive to an input. As previously discussed, "pinning" can refer to storing the resolution information in association with the class of alerts to which the resolved alert instance belongs.

The medium 414 can store instructions 442 executable by the processing resource 412 to provide the pinned resolution information with an alert message that corresponds to an unresolved alert instance of the class of alerts. In some embodiments, the pinned resolution information can be provided in connection with resolved alert instances of the alert class. For instance, resolution information may be viewed for alert instances resolved in the past, in addition to those currently unresolved. The unresolved alert instance can refer to a current alert instance or a "new" alert instance. In some embodiments, the medium 414 can further store instructions executable by the processing resource 412 to provide the pinned resolution information according to a priority level of the pinned resolution information. The priority level can be determined based on user input and/or on a type of the resolution information (e.g., whether the resolution information includes steps for resolving the unresolved alert instance).

Figure 5:
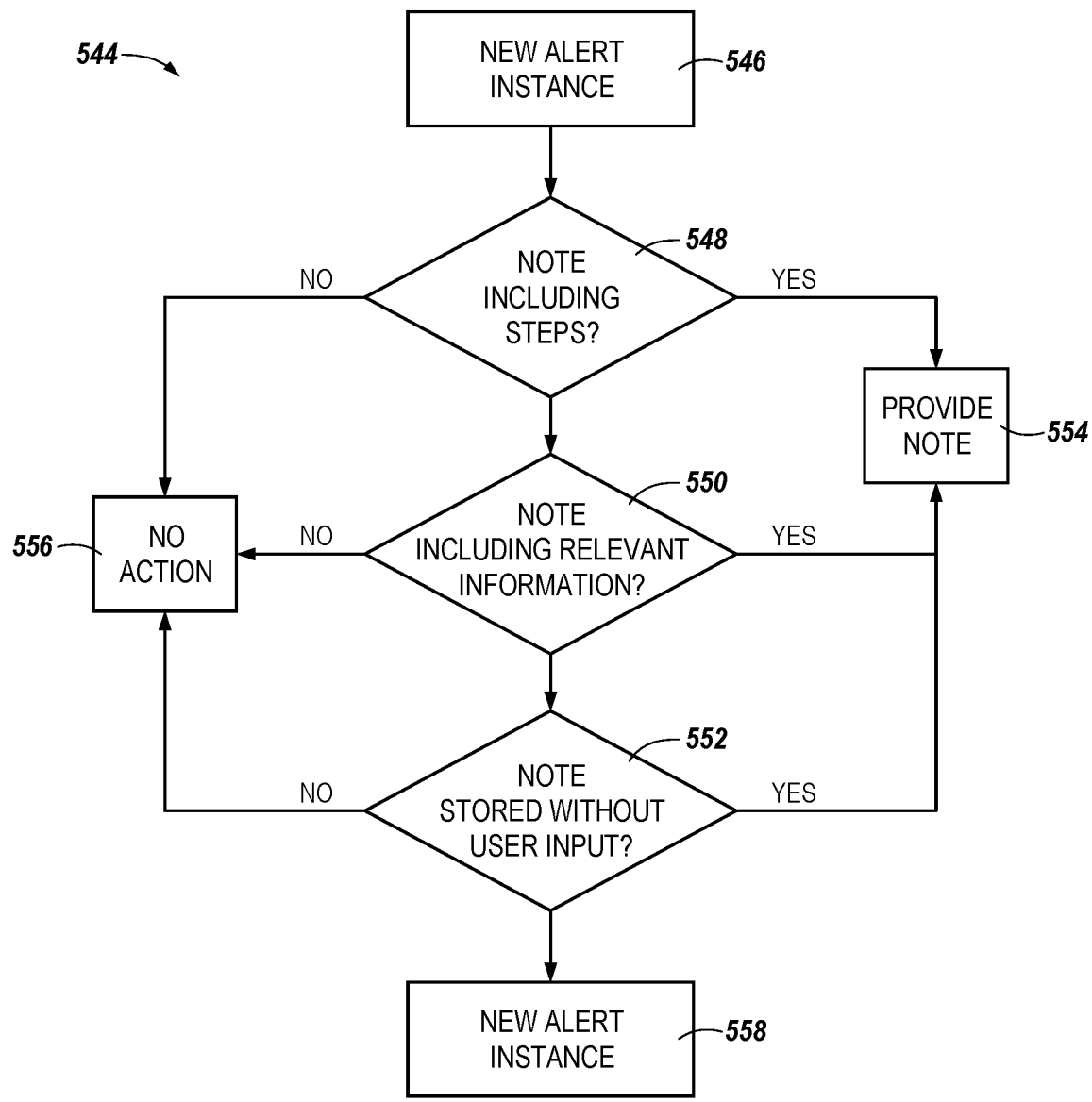
FIG. 5 is a flow chart associated with a process of implementing persistent alert notes according to the present disclosure.

FIG. 5 is a flow chart 544 associated with a process of persistent alert notes according to the present disclosure. The flow chart 544 can represent a number of steps taken by a log management server and/or a client device as described herein, for instance. At 546, a new alert instance is received and/or retrieved. The alert instance can be obtained as a product of a workflow of the log management server, for instance, and may be a portion of a workflow of a new alert construction process. At 548, 550, and 552, determinations are made regarding whether a note has been stored in association with a class of alerts of the alert instance. If so, at 548, a determination is made regarding whether the class of alerts is stored in association with a note that includes steps for resolving the alert instance of the class of alerts; at 550, a determination is made regarding whether the class of alerts is stored in association with a note that includes relevant information for resolving the alert instance; and at 552, a determination is made regarding whether the class of alerts was automatically stored in association with a note (e.g., stored in association without user input). In some embodiments, the determination at 552 can include a determination of whether a note was automatically deduced and/or stored in association with the class of alerts. If the determination at any of blocks 548, 550, and or 552 is yes, the associated note is provided at 554. Notes marked as resolutions (e.g., those involving steps) can be highlighted and/or otherwise prioritized. Notes receiving high evaluations can be highlighted and/or otherwise prioritized. Note(s) can be provided via a user interface, for instance. Notes can be provided via text message (e.g., short message service (SMS)). Notes can be provided as push notifications. Notes can be provided via email. Embodiments herein do not limit the provision of notes to a particular manner.

If the determination of each of the blocks 548, 550, and/or 552 is no, then no action is taken at 556. In some embodiments, the user may be prompted to determine and/or enter a new note upon resolving the alert instance. At 558, the process can resume and a new alert instance can be determined, received, and/or retrieved, which may be a portion of a workflow of the new alert construction process referenced above at 546.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for persistent alert notes, comprising:
receiving an alert message via a log management server, wherein the log management server is to monitor logs from one or more log sources in a software defined data center, wherein at least one of the logs include event information that causes a triggering of an alert which is communicated as the alert message, and wherein the alert message indicates a current alert instance to be resolved, particular to a class of alerts;
retrieving, in response to receiving the alert message, a plurality of notes stored in association with the class of alerts via the log management server, wherein the plurality of notes includes resolution information corresponding to a previous resolved alert instance particular to the class of alerts, and wherein the resolution information includes information relevant to a resolution of the previous resolved alert instance; and
providing the plurality of retrieved notes, in a list of retrieved notes, via a user interface of the log management server, wherein the list is sorted by a respective quantity of views.

2. The method of claim 1, wherein the method includes retrieving a different note comprising a last note occurring before the previous alert instance was resolved.

3. The method of claim 1, wherein retrieving the plurality of notes comprises retrieving the plurality of notes, which are stored in association with the class of alerts from a storage storing the plurality of notes, each stored in association with a respective class of alerts.

4. The method of claim 1, wherein the method includes storing the plurality of notes, each in association with a respective class of alerts, in a storage functionality in communication with the log management server.

5. The method of claim 4, wherein the method includes receiving a new note corresponding to the current alert instance and storing the new note in association with the particular class of alerts in the storage functionality.

6. The method of claim 1, wherein the method includes providing the plurality of retrieved notes in the list of retrieved notes, wherein the list is sorted according to an indicated user evaluation of at least one of the retrieved notes.

7. A system for persistent alert notes, comprising:
a processor; and
memory configured to store instructions which, when executed by the processor, cause the processor to:
provide an interface to:
receive a plurality of notes, wherein each note comprises resolution information corresponding to a resolved alert instance, wherein the resolved alert instance is particular to a class of alerts from a log management server, and wherein the resolution information includes information relevant to a resolution of the resolved alert instance;
receive an input causing the plurality of notes to be associated with the class;
display the plurality of notes responsive to an occurrence of a subsequent alert instance particular to the class of alerts, wherein the log management server is to monitor logs from one or more log sources in a software defined data center, and wherein at least one of the logs include event information that causes a triggering of an alert which is communicated as the subsequent alert instance; and
receive a user evaluation of the plurality of notes;
store the plurality of notes in association with the class of alerts; and
store the evaluation in association with the plurality of notes,
wherein the interface is configured to display the plurality of notes in a particular order based on the user evaluation of the plurality of notes without user input responsive to the occurrence of the subsequent alert instance.

8. The system of claim 7, wherein each of the plurality of notes includes steps for resolving the alert instance.

9. The system of claim 8, wherein the evaluation of the plurality of notes is an indication of a utility of the plurality of notes.

10. The system of claim 8, wherein the interface is configured to:
receive second plurality of notes corresponding to a second resolved alert instance particular to the class of alerts;
receive a second input causing the second plurality of notes to be associated with the class of alerts;
display the second plurality of notes responsive to the occurrence of the subsequent alert instance particular to the class of alerts; and
receive a second evaluation of the second plurality of notes.

11. The system of claim 10, wherein the interface is configured to display the plurality of notes and the second plurality of notes responsive to the occurrence of the subsequent alert instance particular to the class in an order determined based on the evaluation and the second evaluation.

12. A non-transitory machine-readable medium storing instructions for persistent alert notes executable by a processor to cause a computing system to:
receive a plurality of notes, wherein each note comprises resolution information corresponding to an alert instance, the alert instance having been resolved, and wherein the resolution information includes information relevant to a resolution of the resolved alert instance;
pin the plurality of notes to a class of alerts to which the resolved alert instance belongs responsive to an input; and
provide the pinned plurality of notes, sorted according to a priority level of the pinned plurality of notes, with art alert message that corresponds to an unresolved alert instance of the class of alerts, wherein the alert message is received via a log management server, wherein the log management server is to monitor logs from one or more log sources in a software defined data center, and wherein at least one of the logs include event information that causes a triggering of an alert which is communicated as the alert message.

13. The medium of claim 12, wherein the priority level is determined based, at least in part, on whether the correlated plurality of notes includes steps for resolving the unresolved alert instance.

14. The medium of claim 13, wherein the instructions include instructions to determine that the correlated plurality of notes includes steps for resolving the unresolved alert instance based on an input indicating that the correlated plurality of notes includes steps for resolving the unresolved alert instance.

15. The medium of claim 13, wherein the instructions include instructions to determine that the correlated plurality of notes includes steps for resolving the unresolved alert instance without user input based on a text content of the con-elated plurality of notes.

\* \* \* \* \*